BREAKERLESS IGNITION SYSTEM WITH AUTOMATIC SPARK ADVANCE USING TRIGGERING COIL

Original Filed June 22, 1967

INVENTOR.
MICHAEL J. PITEO

BY
McCormick, Paulding & Huber

ATTORNEYS

United States Patent Office

Re. 27,477
Reissued Sept. 19, 1972

27,477

BREAKERLESS IGNITION SYSTEM WITH AUTOMATIC SPARK ADVANCE USING TRIGGERING COIL

Michael J. Piteo, Enfield, Conn., assignor to R. E. Phelon Company, Inc., East Longmeadow, Mass.

Original No. 3,447,521, dated June 3, 1969, Ser. No. 648,023, June 22, 1967. Application for reissue Nov. 27, 1970, Ser. No. 93,518
Int. Cl. F02p *1/08*
U.S. Cl. 123—148 E 9 Claims

Matter enclosed in heavy brackets [ ] appears in the original patent but forms no part of this reissue specification; matter printed in italics indicates the additions made by reissue.

ABSTRACT OF THE DISCLOSURE

An ignition system for use with an engine having a spark gap ignition device includes a first triggering coil having its axis arranged generally tangentially to the circular path of a magnet assembly fixed to a rotor rotated in synchronism with the operation of the engine. A ramp voltage is induced in the first coil and triggers an associated switching device to cause a spark when the induced voltage reaches a given triggering voltage, the steepness of the ramp being dependent on the rotor speed so that at different speeds the triggering voltage is reached at different rotor positions. A second triggering coil connected in parallel with the first coil and having its axis arranged generally radially of the circular magnet path produces a triggering voltage for causing a spark at a definite rotor position during low speed operation. The magnet assembly is also used in conjunction with another coil forming part of a condenser discharge system for generating the electrical power used to produce the spark.

Background of the invention

This invention relates to ignition systems for spark ignited engines, and deals more particularly with a breakerless ignition system having an automatic spark advance.

Several different breakerless ignition systems have been proposed in the past wherein the conventional mechanical breaker is replaced by a transistor, silicon controlled rectifier, thyratron or other electronic switch controlled in some manner by a triggering signal. These systems are generally desirable in that they usually can be made more compact than equivalent breaker systems and being less subject to mechanical wear and deterioration have a larger service life. Nevertheless, up to this time the providing of an automatic spark advance in breakerless systems has presented problems and the absence of a good means for obtaining an automatic advance has in many cases been a drawback to the acceptance of breakerless systems.

The general object of this invention is therefore to provide a breakerless ignition system having a simple, inexpensive and reliable means for automatically producing an advance in the timing of the spark as the speed of the associated engine increases. In the description which follows the means for producing the automatic advance is described in conjunction with a condenser discharge ignition system, and this is the presently preferred application. This however should not be taken as limiting the scope of the invention as the invention, at least in its broader aspects, may be applied as well to other breakerless systems.

Summary of the invention

In a breakerless ignition system for a spark ignition engine the spark is controlled by an electronic switch which in turn is controlled by a triggering coil positioned adjacent the circular path of a magnet assembly carried by a rotor rotated by the engine. The magnet assambly includes two poles, respectively charged magnetically north and magnetically south, spaced from one another circumferentially of the magnet path so that magnetic flux flows from one pole to the other along flux lines in the shape of generally tangentially extending loops connecting the poles. The triggering coil has its axis arranged generally tangentially of the magnet path so that the flux lines in cutting it induce a generally ramp shaped voltage waveform therein. A second triggering coil is connected in parrallel with the first triggering coil and has its axis arranged generally radially of the magnet path so that a spike shaped voltage waveform is induced therein for triggering the electronic switch at low engine speeds where the voltage induced in the first coil does not rise to the triggering level.

Description of the preferred embodiment

Figure 1:
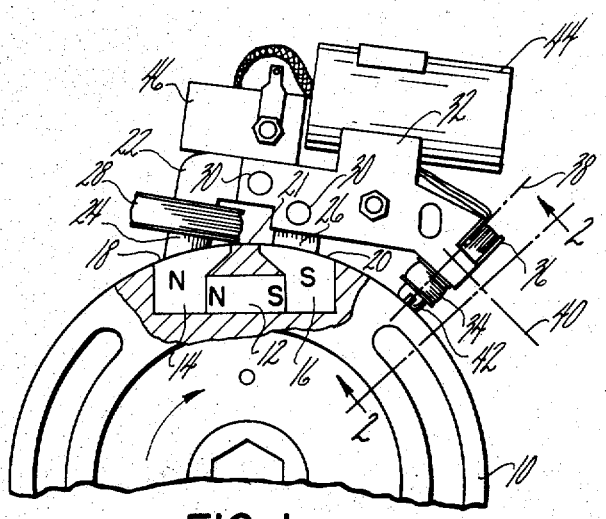
FIG. 1 is an elevational view of part of an ignition system embodying the present invention, part of the rotor being shown broken away to reveal the magnet assembly.
Figure 2:
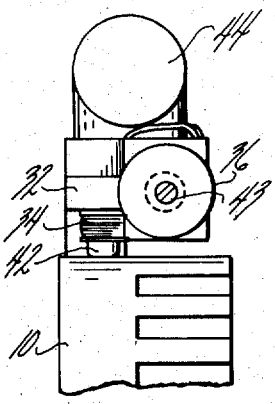
FIG. 2 is a view taken on the line 2—2 of FIG. 1.

Turning to the drawings, and first considering FIGS. 1 and 2 the parts of the ignition system there shown include a rotor 10 which in its use is fixed to the crank shaft, cam shaft, or other rotating part of the associated engine so as to be rotated in synchronism with the operation of the engine. Fixed to the rotor 10, as by being embedded in the base material of the rotor, is a magnet assembly consisting of a permanent magnet 12 and two pole pieces 14 and 16. The magnet 12 is magnetically charged in a direction tangentially of the rotor 10 and the pole pieces 14 and 16 engage its opposite ends so as to be oppositely magnetically charged as indicated. The pole piece 14 has a pole face 18 and the pole piece 16 a pole face 20. The pole faces 18 and 20 are located on the peripheral surface of the rotor and are tangentially spaced from one another by a short gap 21 filled with the base material of the rotor, such material being a non-magnetic material such as aluminum.

Cooperating with the rotor 10 is a stator assembly including a laminated iron core 22 having two tangentially spaced legs 24 and 26 terminating in inwardly facing faces closely spaced from the rotor periphery. On the leg 24 is a generating coil 28, and from FIG. 1 it will be evident that as the magnet assembly is moved past the core 22 a changing magnet flux is established in the leg 24 and in turn induces a changing voltage in the coil 28.

Fixed to the core 22, as by rivets 30, 30, is a bracket 32 of aluminum or other-non-magnetic material which supports two triggering coils 34 and 36. Both of these coils are arranged so as to be located forwardly of the stator core 22 with regard to the direction of rotation of the rotor 10, as shown by the arrow in FIG. 1. Therefore, during each revolution of the rotor the magnet assembly first passes the core 22 and induces a voltage waveform in the generating coil 28 before reaching and inducing any significant voltages in the triggering coils 34 and 36. In FIG. 1 the axis of the triggering coil 34 s indicated by the line 38 and the axis of the triggering oil 36 is indicated by the line 40. From this figure and IG. 2, it will therefore be noted that the arrangement f these coils is such that the axis 38 of the coil 34 is enerally radially oriented relative to the rotor 10 and o the circular path traversed by the magnet assembly as he rotor rotates, and the axis 40 of the coil 36 is rranged generally tangentially to the rotor and the cirular magnet assembly path. The two coils 34 and 36 re further located at approximately the same angular osition along the circular path. The coil 34 is fixed to the upporting bracket 32 by a screw 42 of iron or other magetic material which passes through the center of the coil nd has a head located close to the peripheral surface f the rotor. The coil 36 is fixed to the bracket by a on-magnetic screw 43 and does not include any magetic core which would tend to distort any magnetic field hrough which it passes.

Figure 3:
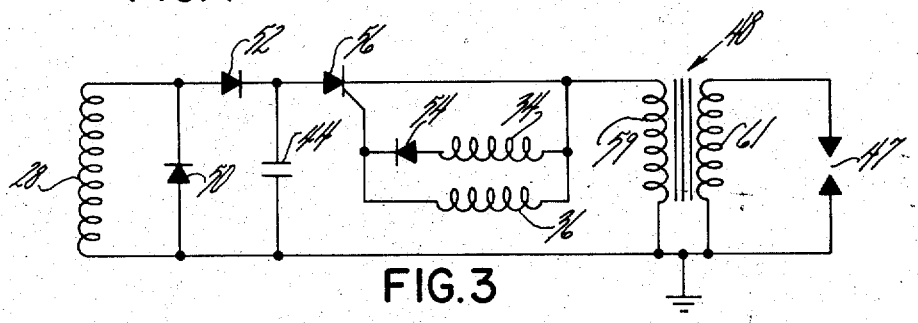
FIG. 3 is a schematic wiring diagram of an ignition system of which the parts shown in FIG. 1 are a part.

The bracket 32 may also be used to support other parts f the ignition system and in the device illustrated in FIG. supports a condenser 44 and a board 46 to which the iodes and silicon controlled rectifier of the circuit shown n FIG. 3 are fixed.

FIG. 3 is a schematic diagram showing the entire ignion system in which the parts of FIGS. 1 and 2 are used. Referring to this figure the system, in addition to the enerating coil 28, the triggering coils 34 and 36, and he condenser 44 includes a spark plug 47, or other spark ap ignition device, a step-up transformer 48, diodes 50, 2 and 54, and a silicon controlled rectifier 56, all conected as shown. This system will be recognized as being f the type generally referred to as a condenser disharge system. Basically its operation is as follows. Durng each revolution of the rotor 10 the magnet assembly nduces a changing voltage waveform in the generating oil 28 having both positive and negative portions. The egative portion of each cycle is shorted out by the diode 0 connected across the generating coil 28 and the positive ortion charges the condenser 44, the diode 52 preenting leakage or discharge of the condenser through the oil 28 after it is charged. After the condenser is charged t is suddenly discharged through the primary coil 59 f the transformer 48 to induce a high voltage in the secndary coil 61, and to thereby cause a spark at the spark lug 46. This discharging of the capacitor 44 is in turn ontrolled by the silicon controlled rectifier 56 which is riggered by one or the other of the triggering coils 34 and 6. The two triggering coils 34 and 36 are connected in arallel with one another across the cathode and gate erminals of the silicon controlled rectifier 56 and the iode 54 is connected in series with the coil 34 to preent the voltage induced in the coil 36 from being disipated in the coil 34.

Figure 4:
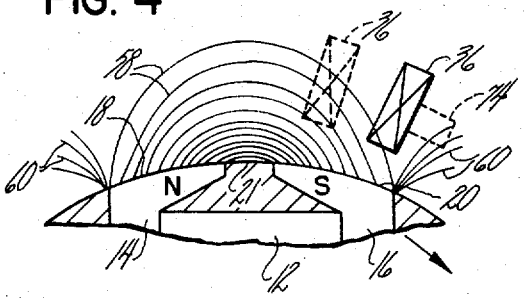
FIG. 4 is a diagram showing the distribution of magnetic flux in the vicinity of the magnet assembly of FIG. 1 and illustrating how this flux field is cut by the tangential trigger coil.

The effect of the triggering coils 34 and 36 is such as o cause the silicon controlled rectifier 56 to be switched rom a non-conducting to a conducting state at different ngular positions of the rotor in accordance with the otor speed and to thereby advance the occurrence of he spark as the rotor and engine speed increases. The nanner in which this is accomplished may best be understood by reference to FIGS. 4 and 5. In first considering IG. 4, this figure shows the general character of the nagnetic flux field located in the vicinity of the pole ieces 14 and 16. It will be seen that the field consists f lines 58, 58 of flux which are generally loop shaped nd extend in a generally tangential direction from the ole face 18 to the pole face 20. The lines 60, 60 repesent leakage flux from the leading end of the pole iece 16 and the trailing end of the pole piece 14. The flux lines 58, 58 are relatively close to one another in the vicinity of the gap 21 between the pole faces 18 and 20 and become more widely spaced in moving ither tangentially or radially outwardly from the gap. The solid lines in FIG. 4 show the tangentially arranged triggering coil 36 at one position of the rotor and the broken lines show it at a subsequent position of the rotor. From this it can be seen that as the coil 36 is moved from the leading end of the pole face 20 toward the gap 21 an ever increasing number of flux lines pass through it, and as a result of this movement a generally ramp shaped voltage waveform is therefore induced in the coil 36. Furthermore, as the speed of rotation of the rotor 10 is increased the rate at which the flux passing through the coil 36 is varied is increased so that a steeper voltage waveform is induced in the coil.

The triggering coil 34, which is arranged radially with respect to the rotor 10 and the circular magnet path and which has an iron core formed by the screw 42, produces a waveform characterized by a relatively sharp spike which appears at the instant the coil passes the gap 21 between the two poles faces. This is due to the fact that as the coil 34 traverses the pole face 20 some small amount of flux will tend to flow through the screw and therefore through the coil 34. When the screw 42 reaches the gap 21, however, the screw head forms a low reluctance path for the flow of flux between the pole face 18 and the pole face 20, and the flux passing through the coil 34 is suddenly reduced to produce a spike in the voltage appearing across the coil.

Figure 5:
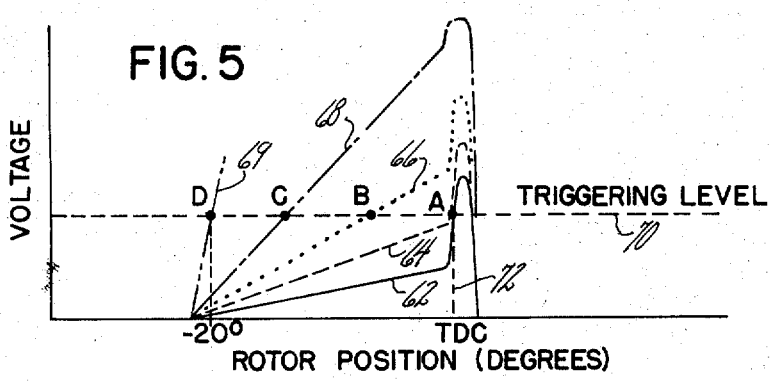
FIG. 5 is a diagram illustrating the voltage waveforms produced by the two triggering coils at different speeds of the rotor of FIG. 1.

Since the coils 34 and 36 are connected in parallel the voltage applied to the gate terminal of the silicon controlled rectifier 56 is a combination of the waveforms appearing at the two coils, and the combined waveform is shown for different speeds of the rotor by the lines 62, 64, 66 and 68 of FIG. 5. The line 62 represents the waveform applied to the silicon controlled rectifier at a relatively low rotor speed such as obtained during cranking of the engine during starting, the line 64 represents the waveform applied at a somewhat higher rotor speed, the line 66 represents the waveform applied at a still higher rotor speed, and the line 68 represents the waveform applied at a yet higher speed. The line 69 represents part of the waveform obtained at or near a maximum speed. In each of the waveforms 62, 64, 66 and 68 the generally ramp shaped portion appearing at the left is produced by the tangentially arranged triggering coil 36 and the spike shaped portion appearing at the right is produced by the radially arranged triggering coil 34. The triggering level or voltage required to trigger the silicon controlled rectifier 56 is indicated by the line 70 in FIG. 5.

In considering FIG. 5, therefore, it will be noted that at low engine speeds the voltage waveform applied to the silicon controlled rectifier 56 is such that the ramp portion of the waveform does not rise to the triggering level 70 before the rotor reaches the top dead center position, represented by the line 72, or other position at which it is desired to have the spark occur at low speeds. At this top dead center position, however, the spike shaped waveform produced by the coil 34 occurs and carries the voltage applied to the silicon controlled rectifier above the triggering level to cause the occurrence of a spark at this point. Therefore, for both of the low speed waveforms 62 and 64 the spark occurs at the point A. As the speed of the rotor increases, the steepness of the ramp shaped portion of the waveform increases and eventually the ramp voltage itself rises above the triggering level 70, the triggering then taking place at the instant the voltage waveform crosses the triggering level as indicated at the point B for the waveform 66, the point C for the waveform 68 and the point D for the waveform 69.

From FIG. 5 it can therefore be seen that as the speed of the rotor and engine increases the occurrence of the spark advances in relation to the rotor position. As indicated in FIG. 5 the system whose characteristics are illustrated by the illustrated waveforms is such that at the maximum engine speed represented by the waveform 69 the spark occurs approximately 20° in advance of the top dead center position. Various different amounts of maximum advance can be obtained, however, by varying the length of the pole faces 18 and 20. That is, as the pole faces are lengthened the number of degrees of rotor rotation over which the voltage ramp occurs is likewise lengthened. Also, varying the pacing of thse coil 36 from the rotor periphery or the number of turns therein varies the maximum voltage to which the ramp voltage induced in the coil 36 will rise the steepness of the ramp, and therefore also effects the spark timing.

The width of the coil 36 should be kept at a minimum so that as the rotor 10 rotates at high speed the coil does not move into the area of the leakage field represented by the lines 60, 60 before the point of maximum desired advance is reached. This is because once the core reaches the leakage field this field will induce a voltage in the opposite direction in the coil. Therefore, until the movement of the rotor causes the leakage field to be moved out of the coil 36 no triggering will take place. This fact may, however, be used for a given set of pole pieces to limit the amount of maximum advance. That is, when a given set of pole pieces exist the amount of maximum advance achieved may be varied by varying the length of the coil 36. In place of lengthening the coil a magnetic core of prescribed length, such as indicated by the broken lines at 74, in FIG. 4 may be inserted in the coil to bring the coil under the influence of the leakage flux at a given position of the rotor, and thereby to limit the maximum advance to this position.

I claim:

1. In a breakerless ignition system for a spark ignition engine, the combination comprising: a spark gap device, means including an electronic switch device for causing the occurrence of a spark at said spark gap device as said switch device is switched from a first state to a second state, a triggering coil coupled with said switching device and operable to switch said switching device from said first state to said second state when the voltage across said triggering coil reaches [rises to] a *predetermined* [pre-determined] level, and a magnet assembly rotated in a circular path in synchronism with the operation of the associated engine, *said magnet assembly defining two spaced pole faces of opposite magnetic polarity which two pole faces, in the absence of a means providing a low reluctance flux path therebetween, establish a magnetic flux field situated in the air in the vicinity of said two pole faces which air-situated flux field is of a varying flux density in a direction circumferentially of said circular* path, said triggering coil being located adjacent said circular path of said magnet assembly and arranged with its axis oriented generally tangentially thereto, *said triggering coil being free of any means substantially changing the character of said air-situated flux field as said magnet assembly moves past said triggering coil so that as said magnet assembly moves past said triggering coil a circumferentially extending portion of said flux field is swept through said triggering coil and so that as a result of said circumferentially varying density of said flux field a ramp-shaped voltage waveform is induced in said triggering coil the steepness of which waveform is dependent on the speed of said magnet assembly relative to said triggering coil whereby said voltage across said triggering coil reaches said predetermined level at different positions of said magnet assembly relative to said triggering coil for different speeds of said magnet assembly relative to said triggering coil.*

2. The combination defined in claim 1 further characterized by said [magnet assembly including] two poles *of said magnet assembly being* respectively charged magnetically north and magnetically south *and being* spaced from one another circumferentially of said circular path.

3. The combination defined in claim 2 further characterized by said means for causing the occurrence of a spark including a generating coil located adjacent said circular path so as to have a voltage induced therein as said magnet assembly moves therepast, a condenser coupled with said generating coil so as to be charged by the voltage induced therein during each revolution of said magnet assembly, and a step-up transformer having a secondary coil connected to said spark gap ignition device and a primary coil connected to said condenser through said electronic switch device.

4. The combination defined in claim 3 further characterized by said electronic switch device comprising a silicon controlled rectifier.

5. The combination defined in claim 2 further characterized by a second triggering coil connected in parallel with said first mentioned triggering coil, said second triggering coil being located adjacent said circular path of said magnet assembly and having its axis oriented generally radially of said path.

6. The combination defined in claim 5 further characterized by said first and second coils being located at approximately the same angular position along said circular path.

7. The combination defined in claim 5 further characterized by said second triggering coil including a magnetic core.

8. The combination defined in claim 2 further characterized by said triggering coil having a magnetic core which extends forwardly therefrom with respect to the direction of rotation of magnet assembly and in a generally tangential direction relative to said circular path so as to enter the leakage flux field adjacent the leading end of the leading one of said poles in advance of said coil as said coil is moved over said leading pole toward its leading edge.

9. The combination defined in claim 3 further characterized by said generating coil being received on a magnetic core positioned adjacent said circular path and said triggering coil being fixed to said core by a non-magnetic bracket.

References Cited

The following references, cited by the Examiner, are of record in the patented file of this patent or the original patent.

UNITED STATES PATENTS

| | | | |
|---|---|---|---|
| 3,464,397 | 9/1969 | Burson | 123—148 E |
| 3,324,841 | 6/1967 | Kebbon et al. | 123—149 R |
| 3,072,823 | 1/1963 | Kirk. | |
| 3,349,284 | 10/1967 | Roberts | 315—223 |
| 3,356,896 | 12/1967 | Shano. | |
| 3,358,665 | 12/1967 | Carmichael et al. | |

LAURENCE M. GOODRIDGE, Primary Examiner

U.S. Cl. X.R.

123—149 D